US012678744B2

(12) United States Patent
Mercado Alvarado

(10) Patent No.: US 12,678,744 B2
(45) Date of Patent: Jul. 14, 2026

(54) JET PROPULSION DRY POWDER DISSOLUTION UNIT THAT USES A SUBMERSIBLE ACTUATOR

(71) Applicant: Adalberto Mercado Alvarado, Bayamon, PR (US)

(72) Inventor: Adalberto Mercado Alvarado, Bayamon, PR (US)

( * ) Notice: Subject to any disclaimer, the term of this patent is extended or adjusted under 35 U.S.C. 154(b) by 780 days.

(21) Appl. No.: 18/119,053

(22) Filed: Mar. 8, 2023

(65) Prior Publication Data

US 2023/0249139 A1 Aug. 10, 2023

Related U.S. Application Data

(63) Continuation-in-part of application No. 17/889,016, filed on Aug. 16, 2022, now Pat. No. 12,453,946, which is a continuation-in-part of application No. 17/577,224, filed on Jan. 17, 2022, now Pat. No. 12,383,850, which is a continuation-in-part of application No. 17/471,546, filed on Sep. 10, 2021, now Pat. No. 12,303,917, which is a continuation-in-part of application No. 17/164,367, filed on Feb. 1, 2021, now Pat. No. 12,233,388, which is a continuation-in-part of application No. 16/906,882, filed on Jun. 19, 2020, now Pat. No. 11,766,644, which is a continuation-in-part of (Continued)

(51) Int. Cl.

| | |
|---|---|
| ***B01F 21/10*** | (2022.01) |
| ***B01F 23/50*** | (2022.01) |
| ***B01F 23/53*** | (2022.01) |
| ***B01F 27/25*** | (2022.01) |
| ***B01F 27/272*** | (2022.01) |
| ***B01F 27/91*** | (2022.01) |
| ***B01F 35/50*** | (2022.01) |
| *B01F 35/30* | (2022.01) |

(52) U.S. Cl.

CPC .............. *B01F 21/10* (2022.01); *B01F 23/53* (2022.01); *B01F 23/56* (2022.01); *B01F 27/25* (2022.01); *B01F 27/272* (2022.01); *B01F 27/91* (2022.01); *B01F 35/50* (2022.01); *B01F 2035/352* (2022.01)

(58) Field of Classification Search

CPC ........ B01F 21/10; B01F 27/25; B01F 27/272; B01F 27/91

See application file for complete search history.

(56) References Cited

U.S. PATENT DOCUMENTS 3,920,779 A * 11/1975 Abele .................... B01F 23/233 261/87
4,242,199 A * 12/1980 Kelley .................. B01F 23/454 210/197

(Continued)

FOREIGN PATENT DOCUMENTS

GB 2095570 A * 10/1982 .............. B01F 27/25
WO WO-8702907 A1 * 5/1987 .............. B01F 27/25
WO WO-2007023864 A1 * 3/2007 .......... B01F 23/2333

*Primary Examiner* — Marc C Howell

(74) *Attorney, Agent, or Firm* — Eugenio J. Torres-Oyola; Victor M. Rodriguez-Reyes; Rafael Rodriguez-Muriel

(57) ABSTRACT

A jet propulsion dry powder dissolution unit that includes a hollow chamber, an upper blending reactor, an impeller, a stator, a stator compartment, a blending reactor nozzle, a submersible actuator, a lower blending reactor, and a solution outlet blending reactor.

8 Claims, 9 Drawing Sheets

Related U.S. Application Data application No. 15/787,758, filed on Oct. 19, 2017, now Pat. No. 10,766,011.

(56) References Cited

U.S. PATENT DOCUMENTS

| | | | | | |
|---|---|---|---|---|---|
| 4,378,165 | A * | 3/1983 | Landberg | B01F 27/91 | 366/270 |
| 4,512,936 | A * | 4/1985 | Oshima | B01F 27/25 | 210/219 |
| 4,650,342 | A * | 3/1987 | Goodwin | B01F 27/81 | 366/264 |
| 4,720,361 | A * | 1/1988 | Andersson | B01F 23/2331 | 261/87 |
| 4,917,577 | A * | 4/1990 | Stirling | B01F 23/23342 | 417/66 |
| 5,011,372 | A * | 4/1991 | Nigrelli | C02F 3/165 | 416/85 |
| 5,043,104 | A * | 8/1991 | Stirling | B01F 25/31242 | 210/219 |
| 5,085,809 | A * | 2/1992 | Stirling | B01J 19/1875 | 210/219 |
| 5,676,889 | A * | 10/1997 | Belgin | B01F 27/91 | 261/93 |
| 5,762,833 | A * | 6/1998 | Gross | B01F 27/25 | 261/93 |
| 5,996,977 | A * | 12/1999 | Burgess | B01F 27/25 | 261/93 |
| 6,736,377 | B1 * | 5/2004 | Chien | B01F 27/25 | 261/93 |
| 2008/0159061 | A1 * | 7/2008 | Han | B01F 25/64 | 366/102 |
| 2010/0207285 | A1 * | 8/2010 | Tanaka | B01F 27/25 | 261/84 |
| 2013/0140246 | A1 * | 6/2013 | Fabiyi | B01F 27/1143 | 261/36.1 |
| 2019/0118148 | A1 * | 4/2019 | Mercado Alvarado | B01F 27/25 | |

* cited by examiner

JET PROPULSION DRY POWDER DISSOLUTION UNIT THAT USES A SUBMERSIBLE ACTUATOR

CROSS-REFERENCE TO RELATED APPLICATION

This application is a continuation-in-part of, and claims the benefit of priority to, U.S. patent application Ser. No. 17/889,016, entitled "Liquid Polymer Dosing and Mixing Chamber & Pump", filed on August 146, 2022, incorporated by reference in its entirety herein, which is a continuation-in-part of, and claims the benefit of priority to, U.S. patent application Ser. No. 17/577,224, entitled "Automatic Self-Cleaning Filter Driven by Submersible Actuator" incorporated by reference in its entirety herein, which in turn is a continuation-in-part of, and claims the benefit of priority to, U.S. patent application Ser. No. 17/471,546, entitled "Substance Separator System driven by a Submersible Actuator", incorporated by reference in its entirety herein, which in turn is a continuation-in-part of U.S. patent application Ser. No. 17/164,367, filed on Feb. 1, 2021, entitled "Liquid Polymer or Chemical Activation System Using a Submersible Actuator", incorporated by reference in its entirety herein, which in turn is a continuation-in-part of U.S. patent application Ser. No. 16/906,882, filed on Jun. 16, 2020, entitled "Liquid Polymer or Chemical Activation System Using a Submersible Actuator", and incorporated by reference in its entirety herein, which in turn is a continuation-in-part of U.S. patent application Ser. No. 15/787,758, filed on Oct. 19, 2017, entitled "Liquid Polymer Activation System Using a Submersible Actuator" the contents of which are hereby incorporated by reference.

STATEMENT REGARDING FEDERALLY SPONSORED RESEARCH AND DEVELOPMENT

N/A

BACKGROUND OF THE INVENTION

Field of the Invention

The present invention relates to a jet propulsion dry powder dissolution unit that uses a submersible actuator.

Discussion of the Background

The mixing of dry powders with liquids usually requires the use of a plurality of equipment such as, dry powder dosing auger systems, vacuum pumps, motor drives, tank mounted mixers, mixing pumps, booster pumps, and/or dosing pumps. The jet propulsion dry powder dissolution unit that is the subject of this disclosure an innovative industrial inline powder dissolution unit that instantaneously and efficiently disperses powders mixing them with liquids into a homogeneous blend; and eliminates the need of having to rely on the aforementioned equipment to achieve the same result. As a result, the jet propulsion dry powder dissolution unit constitute a more efficient system for mixing dry powders with liquids.

SUMMARY OF THE INVENTION

The subject disclosure relates to a jet propulsion dry powder dissolution unit, comprising a hollow chamber, an upper blending reactor, an impeller, a stator, a stator compartment, a blending reactor nozzle, a submersible actuator, a lower blending reactor, and a solution outlet blending reactor; wherein the upper blending reactor comprises a first distal end and a second distal end, wherein each distal end of the upper blending reactor is opposite to each other; wherein first distal end of the upper blending reactor includes one or more inlets that are adapted to receive one or more substances; wherein the second distal end of the upper blending reactor includes one or more holes that are configured to receive one or more screws; wherein the impeller is located inside the upper blending reactor; wherein the impeller is adapted to mix the one or more substances inserted via the one or more inlets; wherein stator compartment comprises a body, a first distal end, and a second distal end, wherein each distal end of the stator compartment is opposite to each other, and wherein the body of the stator compartment is flanked by the first distal end and the second distal end of the stator compartment; wherein the first distal end of the stator compartment includes a top chamber flange having one or more holes that align with the one or more holes on the second distal end of the upper blending reactor; wherein the one or more holes on the top chamber flange of the stator compartment are configured to receive the one or more screws received by the one or more holes on the second distal end of the upper blending reactor; wherein the second distal end of the stator compartment includes a bottom chamber flange having one or more holes, wherein the one or more holes on the second distal end of the stator compartment are configured to receive one or more screws; wherein the stator and the blending reactor nozzle are both located within the body of the stator compartment; wherein the stator is adapted to receive the one or more substances that have been mixed by the impeller and to lead them towards the blending reactor nozzle; wherein the submersible actuator is located within the hollow chamber; wherein the submersible actuator includes a top end, a bottom end, and a shaft extension; wherein a first end of the shaft extension is secured to the top end of the submersible actuator via a shaft coupling unit, and a second end of the shaft extension is coupled to the impeller via a high speed bearing; wherein the first end the submersible actuator is also connected to the blending reactor nozzle via one or more screws, and the second end of the submersible actuator is fixedly resting on the lower blending reactor; wherein the blending reactor nozzle includes an opening adapted to provide access to the shaft extension; wherein the blending reactor nozzle is adapted to lead the mixed one or more substances towards the hollow chamber; wherein the hollow chamber comprises a first distal end and a second distal end, wherein each distal end of the hollow chamber is opposite to each other; wherein first distal end of the hollow chamber includes a top chamber flange having one or more holes that align with the one or more holes on the bottom chamber flange of the stator compartment; wherein the one or more holes on the top chamber flange of the hollow chamber are configured to receive the one or more screws received by the one or more holes on the bottom chamber flange of the stator compartment; wherein the second distal end of the hollow chamber includes a bottom chamber flange having one or more holes configured to receive one or more screws; wherein the lower blending reactor comprises a top end and a bottom end, wherein each of the top end and the bottom end of the lower blending reactor, are opposite to each other; wherein the top end of the lower blending reactor includes one or more holes that align with the one or more holes on the bottom chamber flange of the hollow chamber, and wherein the one or more holes on the top end of the lower blending reactor are adapted to receive the one or more screws received by the one or more holes on the bottom chamber flange of the hollow chamber; wherein the bottom end of the lower blending reactor includes one or more holes adapted to receive one or more screws; wherein the lower blending reactor includes one or more openings adapted to lead the mixed one or more substances towards the solution outlet blending reactor; wherein the solution outlet blending reactor comprises a top end and a bottom end, wherein each of the top end and the bottom end of the solution outlet blending reactor are opposite to each other; wherein the top end of the solution outlet blending reactor includes one or more holes that align with the one or more holes on the top end of the lower blending reactor, and wherein the one or more holes on the top end of the solution outlet blending reactor are adapted to receive the one or more screws received by the one or more holes on the top end of the lower blending reactor; and wherein the bottom end of the solution outlet blending reactor includes an opening adapted to release the mixed one or more substances from the jet propulsion dry powder dissolution unit.

DETAILED DESCRIPTION OF THE INVENTION

Figure 1:
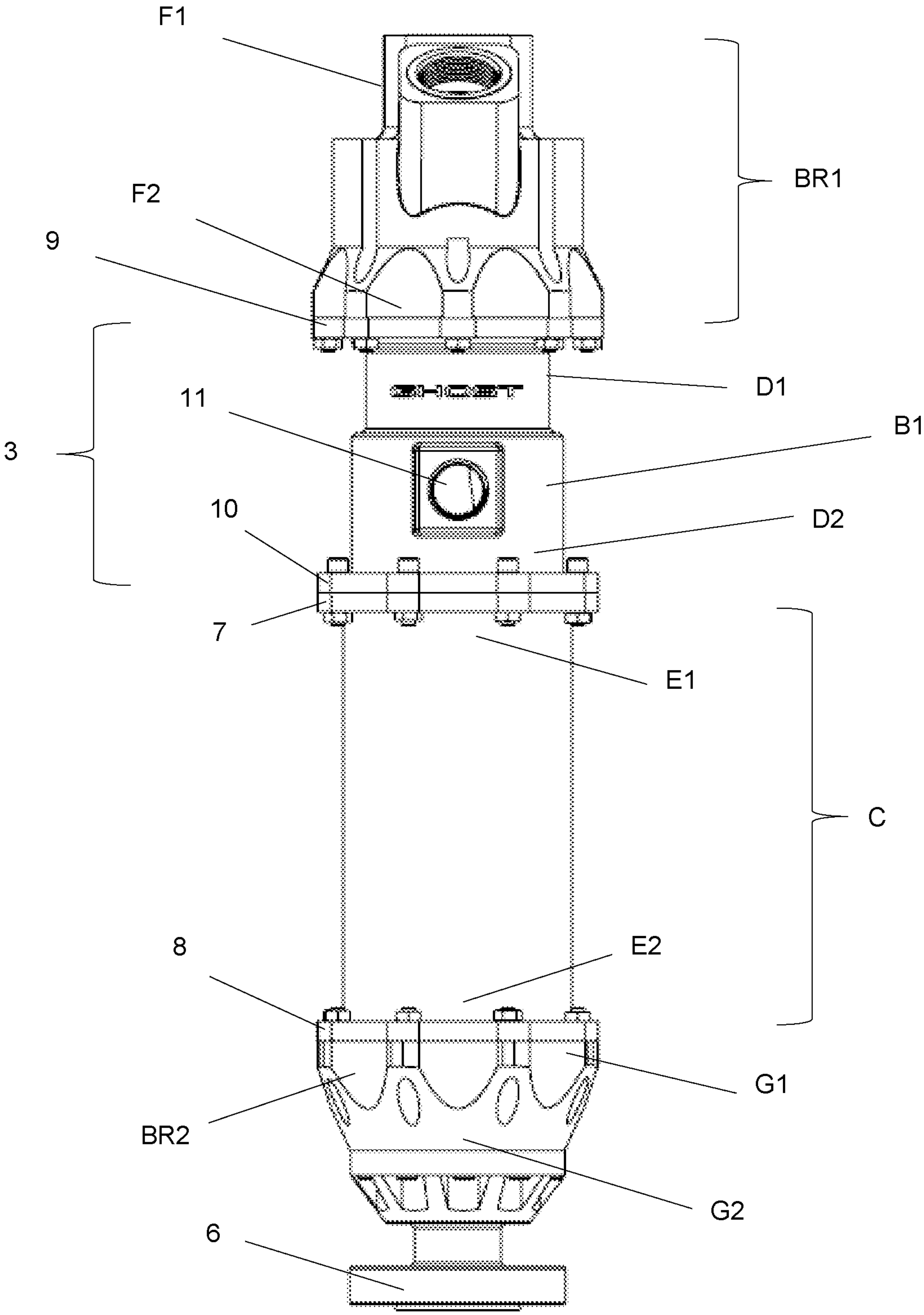
FIG. 1 shows a front view of a jet propulsion dry powder dissolution unit that uses a submersible actuator, in accordance with the principles of the present invention.

The present disclosure discloses several exemplary embodiments of a liquid polymer dosing and mixing chamber that is driven by a submersible motor or actuator as well as a dosing pump that incorporates components from the liquid polymer dosing and mixing chamber, as further described below.

FIGS. 1-9 relate to a jet propulsion dry powder dissolution unit 1 comprising a hollow chamber C, an upper blending reactor BR1, an impeller 13, a stator 2, a stator compartment 3, a blending reactor nozzle 4, a submersible actuator 5, a lower blending reactor BR2, and a solution outlet blending reactor 6.

As shown in FIG. 1, the upper blending reactor BR1 comprises a first distal end F1 and a second distal end F2, wherein each distal end F1, F2 of the upper blending reactor BR1 is opposite to each other. The first distal end F1 of the upper blending reactor BR1 includes one or more inlets 12*a*, 12*b* that are adapted to receive one or more substances, including, but not limited to, any liquid, solid particle, or physical matter. In a preferred embodiment, the first inlet 12*a* is adapted to receive a liquid substances and the second inlet 12*b* is adapted to receive powdered substances. The second distal end F2 of the upper blending reactor BR1, on the other hand, includes one or more holes H1 that are configured to receive one or more bolts, screws, or fasteners S1. The interior of the upper blending reactor BR1 is configured to fit the impeller 13, which in turn is adapted to mix the one or more substances inserted via the one or more inlets 12*a*, 12*b*.

The stator compartment 3, in turn, comprises a body B1, a first distal end D1, and a second distal end D2, wherein each distal end D1, D2 is opposite to each other; and wherein the body B1 is flanked by the first distal end D1 and the second distal end D2, as shown in FIG. 1. Moreover, the first distal end D1 of the stator compartment 3 includes a top chamber flange 9 having one or more holes H2 that align with the one or more holes H1 on the second distal end F2 of the upper blending reactor BR1; wherein the one or more holes H2 on the top chamber flange 9 of the stator compartment 3 are configured to receive the one or more bolts, screws, or fasteners S1 to secure the first distal end D1 of the stator compartment 3 with the second distal end F2 of the upper blending reactor BR1. The second distal end D2 of the stator compartment 3, in turn, includes a bottom chamber flange 10 having one or more holes H3, wherein the one or more holes H3 on the second distal end D2 of the stator compartment 3 are configured to receive one or more bolts, screws, or fasteners S2. The body B1 of the stator compartment 3 may include at least one inlet 11 adapted to lead one or more substances to the interior of the stator compartment 3.

Figure 2:
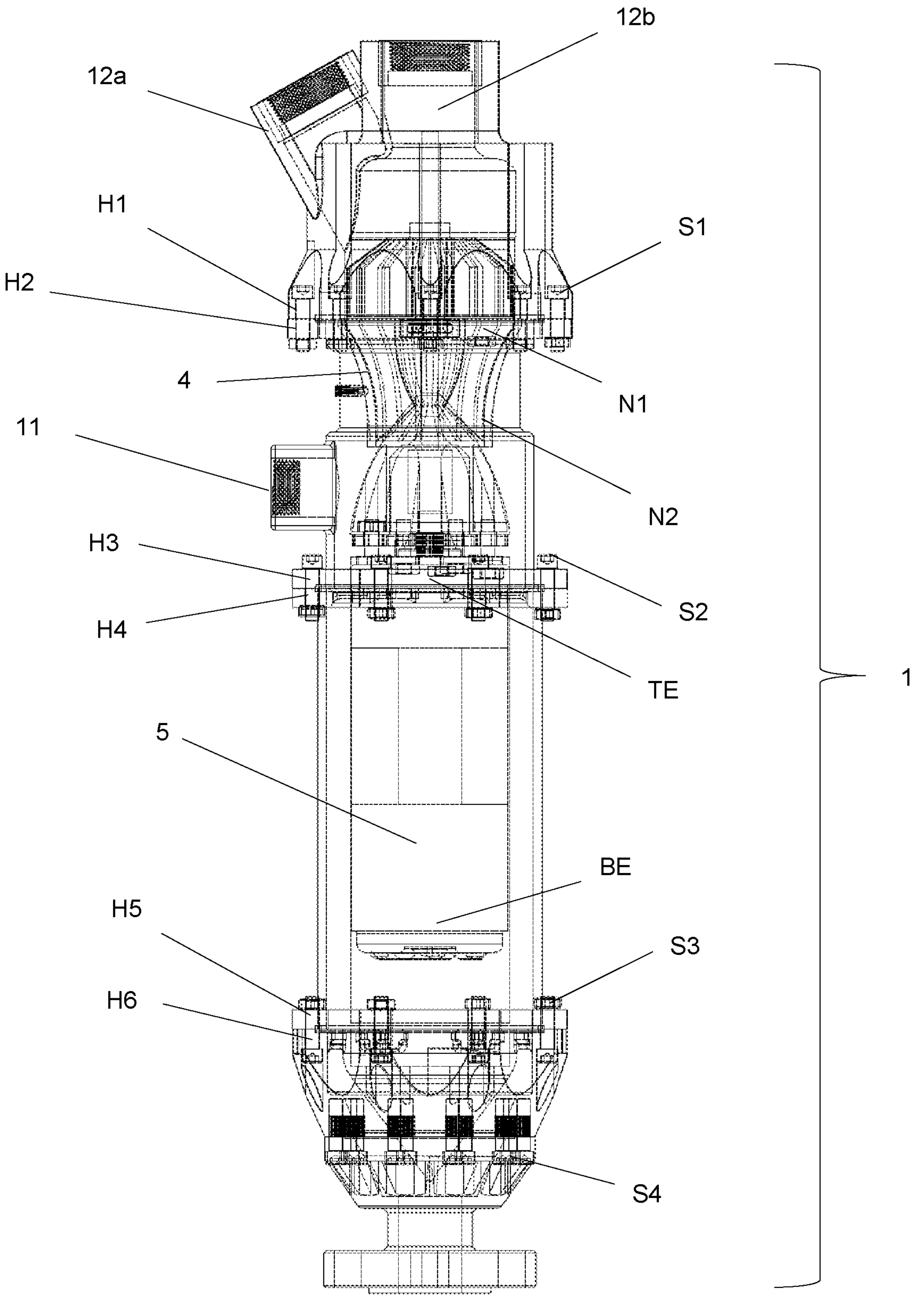
FIG. 2 shows the internal components of the jet propulsion dry powder dissolution unit that uses a submersible actuator, in accordance with the principles of the present invention.
Figure 3:
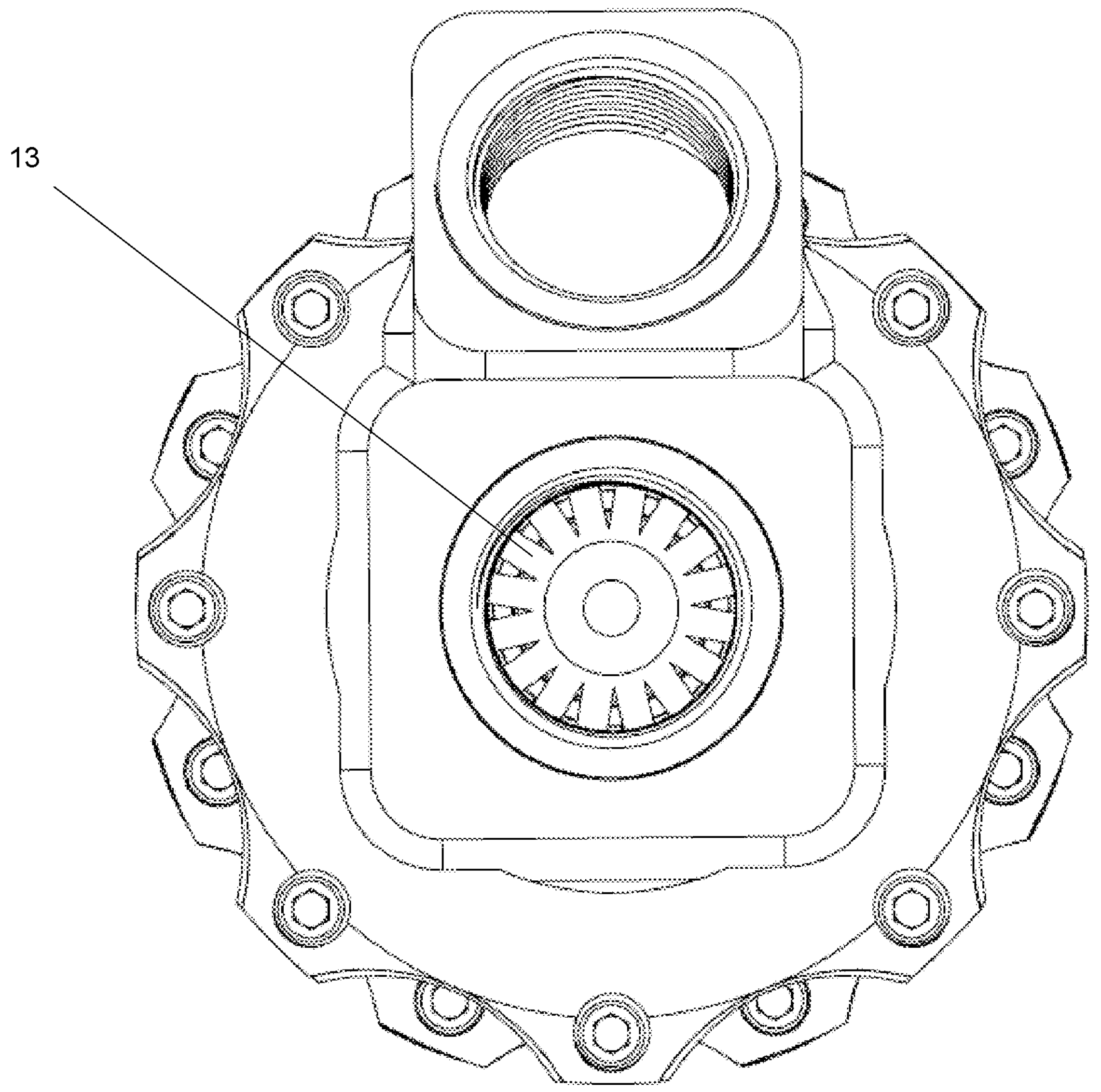
FIG. 3 shows a top view of the jet propulsion dry powder dissolution unit that uses a submersible actuator, in accordance with the principles of the present invention.

It should also be noted that the stator 2 is located within the body B1 of the stator compartment 3. As shown in FIG. 2, the stator 2 is a hollow open ended structure that comprises a first end N1 and a second end N2, wherein the second end N2 is narrower than the first end N1. The first end N1 of the stator 2 is welded or connected to the top chamber flange 9 within the interior of the stator compartment 3. The first end N1 of the stator 2 is adapted to receive the one or more substances that have been mixed by the impeller 13 and lead them towards the second end N2 of the stator 2, which in turn, is adapted to lead the one or more substances towards the blending reactor nozzle 4. It must be noted that the blending reactor nozzle 4 is also located within the interior of the stator compartment 3 directly beneath the second end N2 of the stator 2.

The submersible actuator 5, which is located within the hollow chamber C, includes a top end TE, a bottom end BE, and a shaft extension SE. A first end of the shaft extension SE is secured to the top end TE of the submersible actuator

Figure 8:
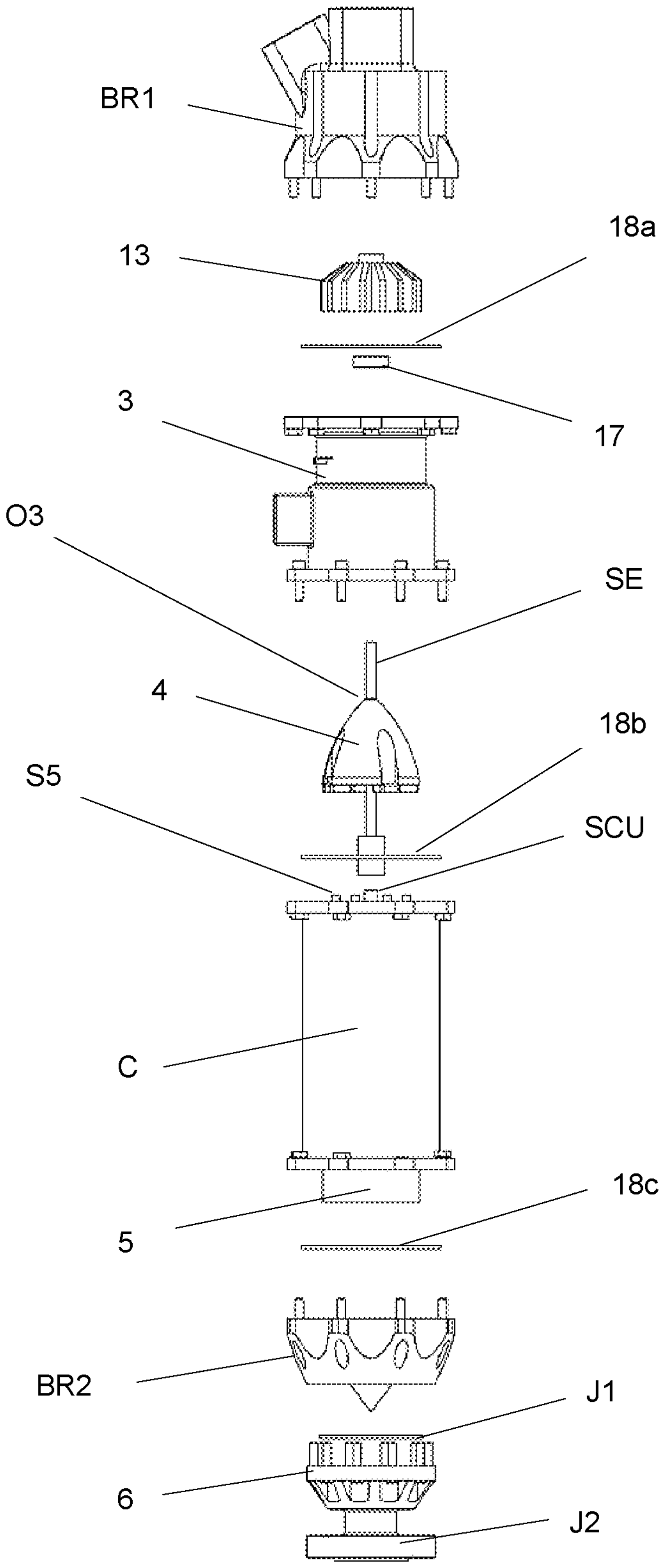
FIG. 8 shows an exploded view of the components of the jet propulsion dry powder dissolution unit that uses a submersible actuator, in accordance with the principles of the present invention.

5 via a shaft coupling unit SCU. A second end of the shaft extension SE, in turn, is coupled to the impeller 13 via a high speed bearing 17. The submersible actuator 5 actuates the rotation of the shaft extension SE and consequently the rotation of the impeller 13. As shown in FIG. 8, an O-ring 18*a* may be included between the high speed bearing 17 and the impeller 13 for a more secure connection between these two elements. It should be noted that the submersible actuator 5 may be a submersible electric motor or a submersible pneumatic or hydraulic motor. Moreover, the first end TE the submersible actuator 5 is also connected to the blending reactor nozzle 4 via one or more bolts, screws, or fasteners S5; whereas the second end BE of the submersible actuator 5 is fixedly resting on the base 14 of the lower blending reactor BR2. As shown in FIG. 8, an O-ring 18*b* may be included between the first end TE of the submersible actuator 5 and the base of the blending reactor nozzle 4 for a more secure connection between these two elements. As also shown in FIG. 8, the blending reactor nozzle 4 is a conelike structure having a base, a vertex, and an opening O3 that passes through the base and the vertex, wherein the opening O3 is adapted to provide access to the shaft extension SE. The opening O3 is what allows the shaft extension SE to reach the high speed bearing 17 attached to the impeller 13 in the upper blending reactor BR1.

As previously noted, the one or more mixed substances are led from the second end N2 of the stator 2 towards the blending reactor nozzle 4. Upon reaching the blending reactor nozzle 4, the mixed substances are then led towards the hollow chamber C, as further explained below. The conelike shape of the nozzle 4 is what facilities directing the flow of the substances towards the hollow chamber C; and prevents the flow of the substances from bouncing backwards towards the upper blending reactor BR1. As such, the conelike shape of the nozzle 4 provides a more hydrodynamic flow within the stator compartment 3. It should be noted that the vertex of the blending reactor nozzle 4 is inserted into the second end N2 of the stator 2 to achieve the aforementioned flow of the substances towards the hollow chamber C.

As shown in FIG. 1, the hollow chamber C comprises a first distal end E1 and a second distal end E2, wherein each distal end E1, E2, is opposite to each other. The first distal end E1 of the hollow chamber C includes a top chamber flange 7 having one or more holes H4 that align with the one or more holes H3 on the bottom chamber flange 10 of the stator compartment 3; wherein the one or more holes H4 on the top chamber flange 7 of the hollow chamber C are configured to receive the one or more bolts, screws, or fasteners S2 to secure the first distal end E1 of the hollow chamber C with the bottom chamber flange 10 of the stator compartment 3. The second distal end E2 of the hollow chamber C, on the other hand, includes a bottom chamber flange 8 having one or more holes H5 configured to receive one or more bolts, screws, or fasteners S3. The hollow chamber C may be circular in shape but may have any other shape.

It should be noted that the submersible actuator 5 is located within the hollow chamber C. As more particularly described in U.S. patent application Ser. No. 17/471,546, which is a parent of the instant application and is incorporated herein by reference, the submersible actuator 5 may be surrounded by a plurality of rings that are aligned one on top of the other. The rings may be linear, concave, or convex in relation to the submersible actuator 5. Each ring in the plurality of rings includes one or more holes, wherein the one or more holes allow the one or more substances to mix further as the substances move down within the hollow chamber C before reaching the lower blending reactor BR2 which is located beneath the hollow chamber C.

Figure 9:
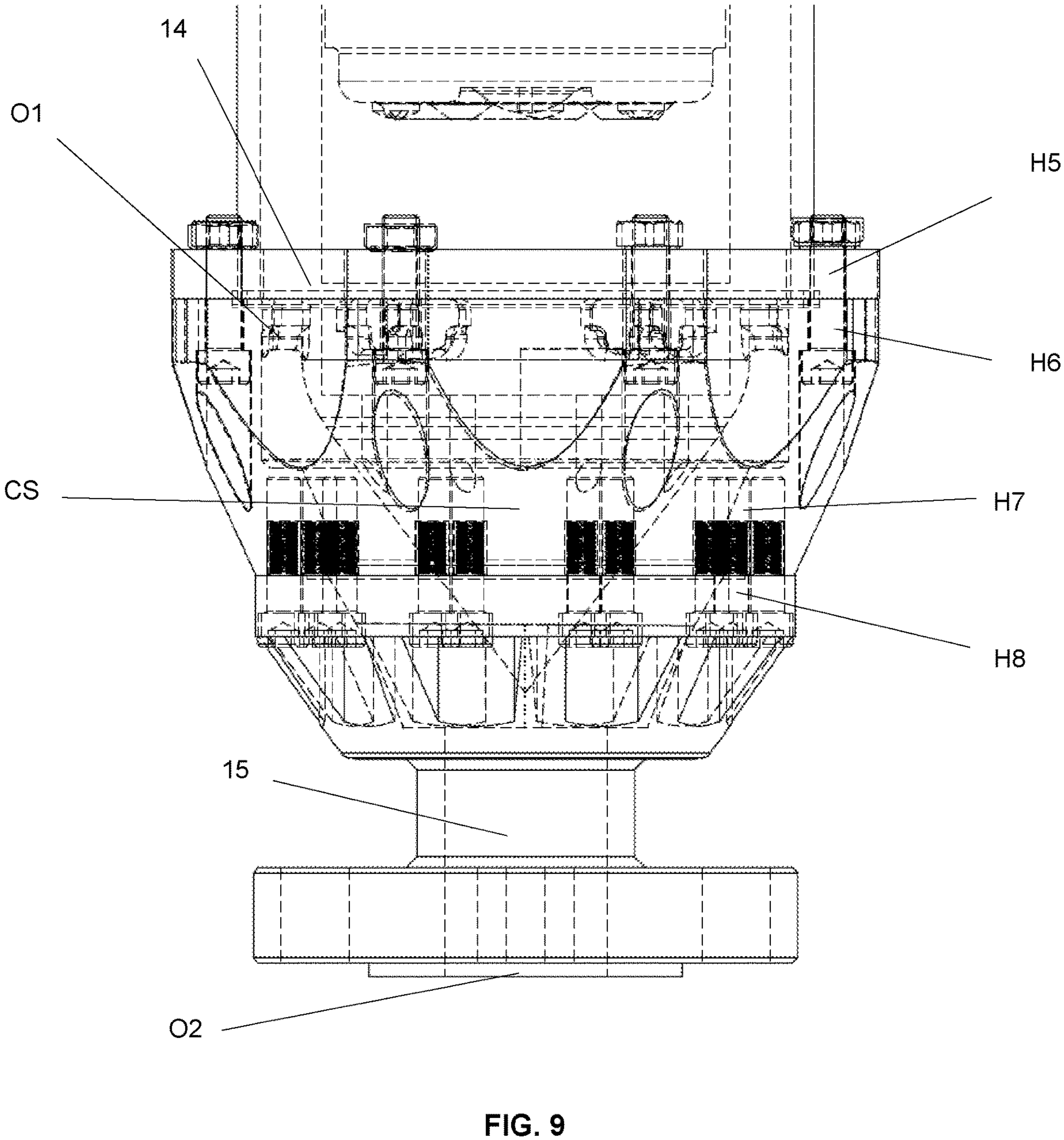
FIG. 9 shows an exploded view of the lower blending reactor and a solution outlet blending reactor components of the jet propulsion dry powder dissolution unit that uses a submersible actuator, in accordance with the principles of the present invention.

The lower blending reactor BR2, in turn, comprises a top end G1 and a bottom end G2, wherein each of the top end G1 and the bottom end G2, are opposite to each other. The top end G1 of the lower blending reactor BR2 includes one or more holes H6 that align with the one or more holes H5 on the bottom chamber flange 8 of the hollow chamber C; wherein the one or more holes H6 on the top end G1 of the lower blending reactor BR2 are adapted to receive the one or more bolts, screws, or fasteners S3. As shown in FIG. 8, an O-ring 18*c* may be included between the bottom chamber flange 8 of the hollow chamber C and the top end G1 of the lower blending reactor BR2 for a more secure connection between these two elements. The bottom end G2 of the lower blending reactor BR2, in turn, includes one or more holes adapted to receive one or more bolts, screws, or fasteners S4. As shown in FIG. 9, the interior of the lower blending reactor BR2, includes a base 14 adapted to fit the bottom end of the submersible actuator 5 in order to hold it in place within the chamber C. The base 14 of the lower blending reactor BR2, further includes one or more openings O1 adapted to lead the mixed substances towards the solution outlet blending reactor 6. It should be noted that the bottom of the base 14 includes a conelike structure CS having a vertex pointing towards the solution outlet blending reactor 6, as shown in FIG. 9. When the mixed substances pass through the opening O1, the conelike structure CS assists in the additional blending of the mixed substances and in leading the flow of the mixed substances into the solution outlet blending reactor 6.

Figure 4:
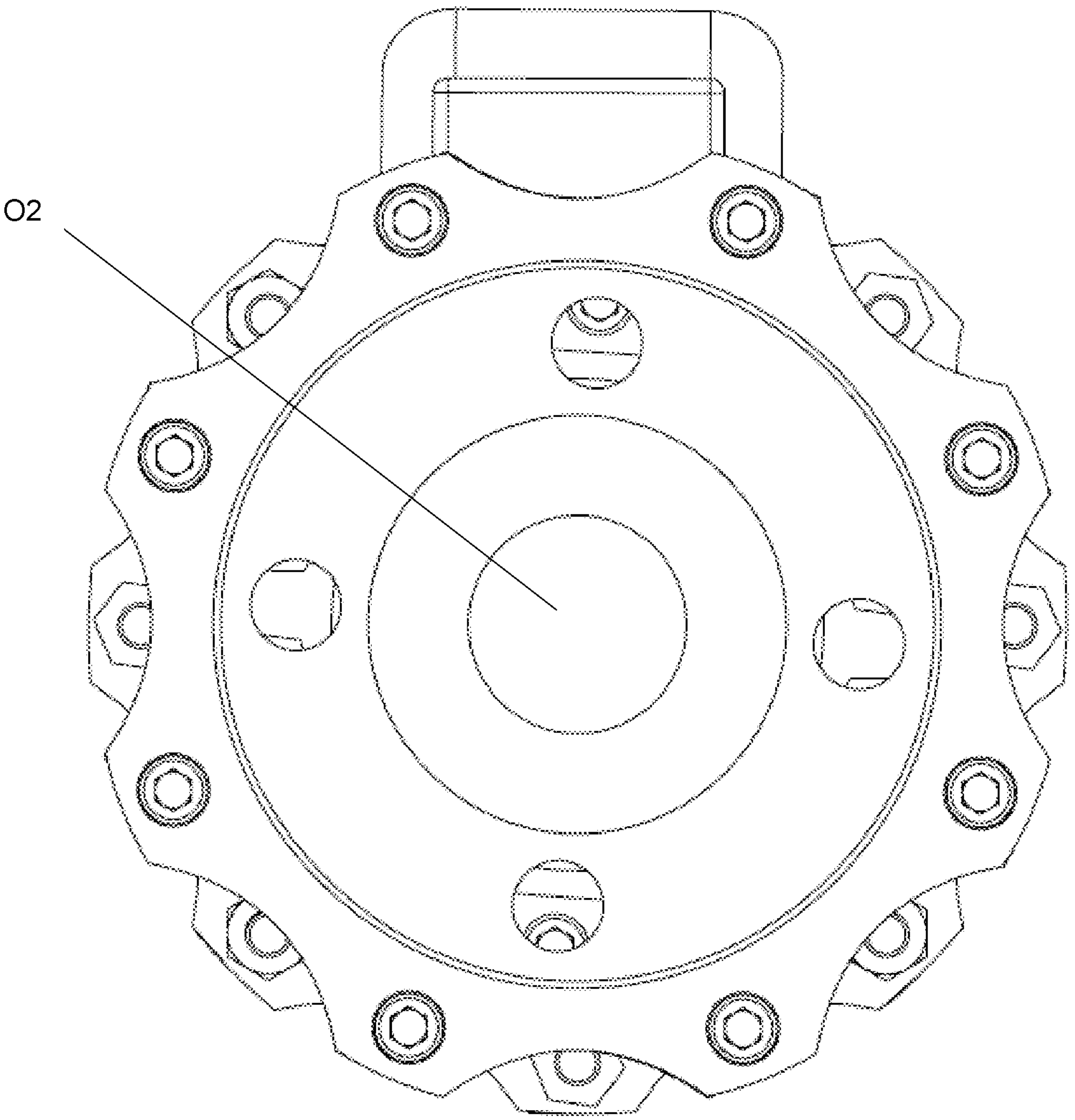
FIG. 4 shows a bottom view of the jet propulsion dry powder dissolution unit that uses a submersible actuator, in accordance with the principles of the present invention.
Figure 5:
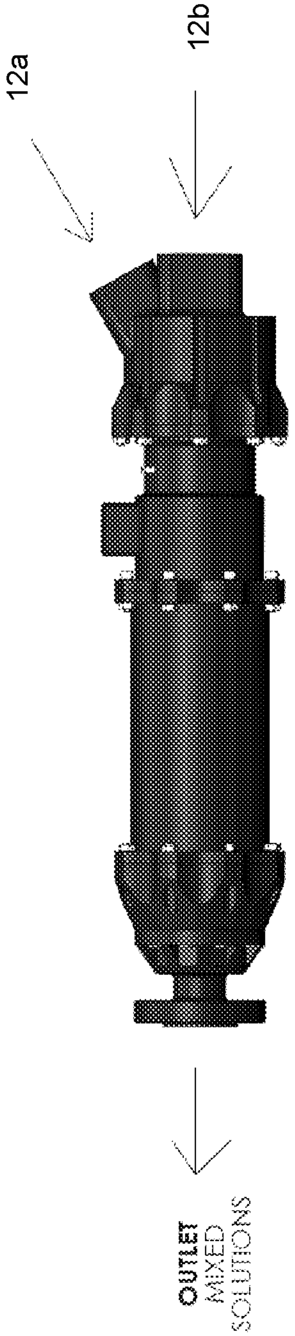
FIG. 5 shows the inlets and outlet of the jet propulsion dry powder dissolution unit that uses a submersible actuator, in accordance with the principles of the present invention.
Figure 6:
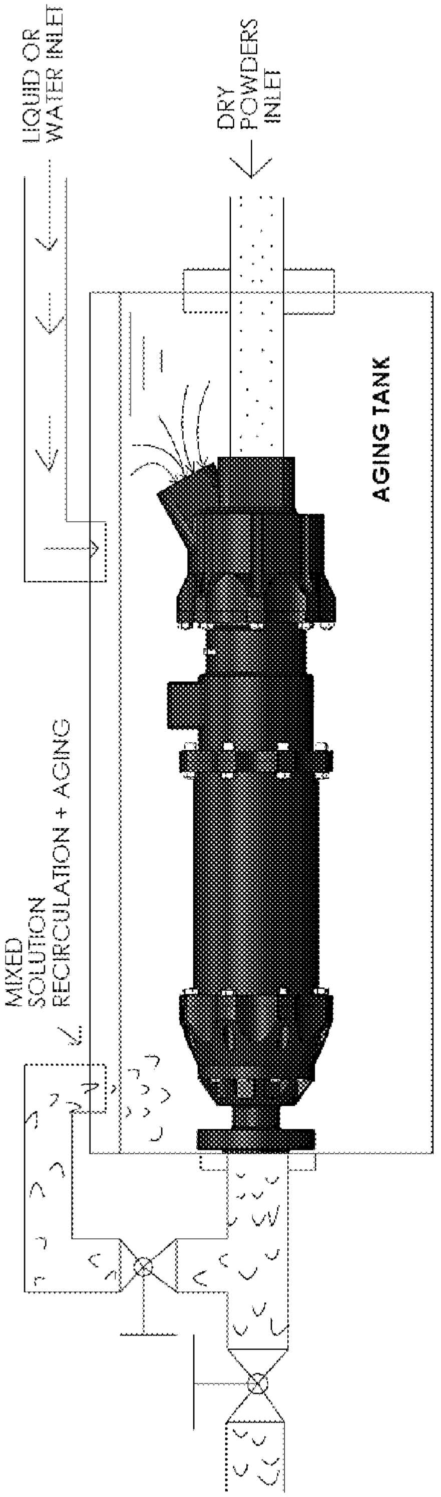
FIG. 6 shows a first mode of operation of the jet propulsion dry powder dissolution unit that uses a submersible actuator, in accordance with the principles of the present invention.
Figure 7:
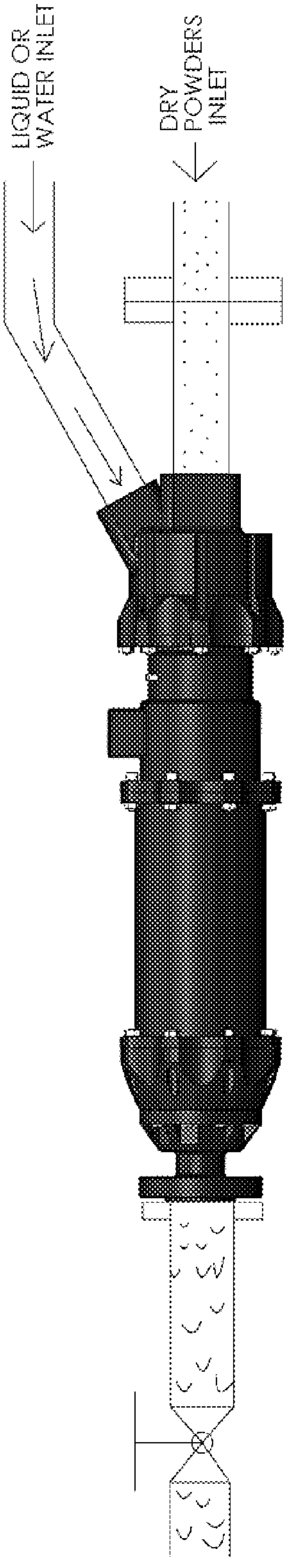
FIG. 7 shows a second mode of operation of the jet propulsion dry powder dissolution unit that uses a submersible actuator, in accordance with the principles of the present invention.

The solution outlet blending reactor 6, on the other hand, comprises a top end J1 and a bottom end J2, wherein each of the top end J1 and the bottom end J2, are opposite to each other. As shown in FIG. 9, the top end J1 of the solution outlet blending reactor 6 includes one or more holes H7 that align with the one or more holes H6 on the top end G1 of the lower blending reactor BR2; and are adapted to receive the one or more bolts, screws, or fasteners S3. The interior of the solution outlet blending reactor 6, comprises a hollow tube 15 adapted to receive the mixed substances from the one or more openings O1 in the lower blending reactor BR2, and to release the mixed substances from the jet propulsion dry powder dissolution unit 1 via the opening O2 located on the bottom end J2 of the solution outlet blending reactor 6, as shown in FIG. 4. It should be noted that, before being release via the opening O2, the substances continue to mix as they move along from the lower blending reactor BR2 into the solution outlet blending reactor 6. FIG. 5 shows the one or more substances being introduced via the one or more inlets 12*a*, 12*b* in the upper blending reactor BR1 and the mixed solution coming out via the solution outlet blending reactor 6. It should be noted that the jet propulsion dry powder dissolution unit 1 may be used submerged in a tank as shown in FIG. 6, or it may be used outside of a tank a shown in FIG. 7.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

What is claimed is:

1. A jet propulsion dry powder dissolution unit, comprising:

a hollow chamber, an upper blending reactor, an impeller, a stator, a stator compartment, a blending reactor nozzle, a submersible actuator, a lower blending reactor, and a solution outlet blending reactor;

wherein the upper blending reactor comprises a first distal end and a second distal end, wherein each distal end of the upper blending reactor is opposite to each other;

wherein first distal end of the upper blending reactor includes one or more inlets that are adapted to receive one or more substances;

wherein the second distal end of the upper blending reactor includes one or more holes that are configured to receive one or more screws;

wherein the impeller is located inside the upper blending reactor;

wherein the impeller is adapted to mix the one or more substances inserted via the one or more inlets;

wherein stator compartment comprises a body, a first distal end, and a second distal end, wherein each distal end of the stator compartment is opposite to each other, and wherein the body of the stator compartment is flanked by the first distal end and the second distal end of the stator compartment;

wherein the first distal end of the stator compartment includes a top chamber flange having one or more holes that align with the one or more holes on the second distal end of the upper blending reactor;

wherein the one or more holes on the top chamber flange of the stator compartment are configured to receive the one or more screws received by the one or more holes on the second distal end of the upper blending reactor;

wherein the second distal end of the stator compartment includes a bottom chamber flange having one or more holes, wherein the one or more holes on the second distal end of the stator compartment are configured to receive one or more screws;

wherein the stator and the blending reactor nozzle are both located within the body of the stator compartment;

wherein the stator is adapted to receive the one or more substances that have been mixed by the impeller and to lead them towards the blending reactor nozzle;

wherein the submersible actuator is located within the hollow chamber;

wherein the submersible actuator includes a top end, a bottom end, and a shaft extension;

wherein a first end of the shaft extension is secured to the top end of the submersible actuator via a shaft coupling unit, and a second end of the shaft extension is coupled to the impeller via a high speed bearing;

wherein the first end the submersible actuator is also connected to the blending reactor nozzle via one or more screws, and the second end of the submersible actuator is fixedly resting on the lower blending reactor;

wherein the blending reactor nozzle includes an opening adapted to provide access to the shaft extension;

wherein the blending reactor nozzle is adapted to lead the mixed one or more substances towards the hollow chamber;

wherein the hollow chamber comprises a first distal end and a second distal end, wherein each distal end of the hollow chamber is opposite to each other;

wherein first distal end of the hollow chamber includes a top chamber flange having one or more holes that align with the one or more holes on the bottom chamber flange of the stator compartment;

wherein the one or more holes on the top chamber flange of the hollow chamber are configured to receive the one or more screws received by the one or more holes on the bottom chamber flange of the stator compartment;

wherein the second distal end of the hollow chamber includes a bottom chamber flange having one or more holes configured to receive one or more screws;

wherein the lower blending reactor comprises a top end and a bottom end, wherein each of the top end and the bottom end of the lower blending reactor, are opposite to each other;

wherein the top end of the lower blending reactor includes one or more holes that align with the one or more holes on the bottom chamber flange of the hollow chamber, and wherein the one or more holes on the top end of the lower blending reactor are adapted to receive the one or more screws received by the one or more holes on the bottom chamber flange of the hollow chamber;

wherein the bottom end of the lower blending reactor includes one or more holes adapted to receive one or more screws;

wherein the lower blending reactor includes one or more openings adapted to lead the mixed one or more substances towards the solution outlet blending reactor;

wherein the solution outlet blending reactor comprises a top end and a bottom end, wherein each of the top end and the bottom end of the solution outlet blending reactor are opposite to each other;

wherein the top end of the solution outlet blending reactor includes one or more holes that align with the one or more holes on the top end of the lower blending reactor, and wherein the one or more holes on the top end of the solution outlet blending reactor are adapted to receive the one or more screws received by the one or more holes on the top end of the lower blending reactor; and wherein the bottom end of the solution outlet blending reactor includes an opening adapted to release the mixed one or more substances from the jet propulsion dry powder dissolution unit.

2. The jet propulsion dry powder dissolution unit of claim 1, wherein the body of the stator compartment includes at least one inlet adapted to lead one or more substances inside the stator compartment.

3. The jet propulsion dry powder dissolution unit of claim 1, wherein the stator is a hollow open ended structure that comprises a first end and a second end, wherein the second end is narrower than the first end.

4. The jet propulsion dry powder dissolution unit of claim 1, wherein the submersible actuator is an electric motor, or a submersible pneumatic, or a hydraulic motor.

5. The jet propulsion dry powder dissolution unit of claim 1, wherein blending reactor nozzle is a conelike structure having a base and a vertex.

6. The jet propulsion dry powder dissolution unit of claim 5, wherein the opening on the blending reactor nozzle passes through the base and the vertex.

7. The jet propulsion dry powder dissolution unit of claim 5, wherein the lower blending reactor includes a base, wherein the bottom of the base includes a conelike structure having a vertex pointing towards the solution outlet blending reactor.

8. The jet propulsion dry powder dissolution unit of claim 1, wherein the interior of the solution outlet blending reactor comprises a hollow tube adapted to receive the mixed substances from the lower blending reactor.

* * * * *